United States Patent [19]

Ban

[11] Patent Number: 5,799,168
[45] Date of Patent: Aug. 25, 1998

[54] STANDARDIZED FLASH CONTROLLER

[75] Inventor: Amir Ban, Ramat Hasharon, Israel

[73] Assignee: M-Systems Flash Disk Pioneers Ltd., Tel Aviv, Israel

[21] Appl. No.: 583,351

[22] Filed: Jan. 5, 1996

[51] Int. Cl.⁶ .................................................. G06F 12/06
[52] U.S. Cl. ................................. 395/430; 395/481
[58] Field of Search ................................. 395/430, 481, 395/483, 405, 484

[56] References Cited

U.S. PATENT DOCUMENTS

| | | | |
|---|---|---|---|
| 4,924,375 | 5/1990 | Fung | 395/484 |
| 5,269,010 | 12/1993 | MacDonald | 395/405 |
| 5,559,988 | 9/1996 | Durante | 395/479 |
| 5,581,723 | 12/1996 | Hasbun | 395/430 |
| 5,604,880 | 2/1997 | Dipert | 395/430 |

OTHER PUBLICATIONS

1996 Flash Memory Book, MICRON Quantum Devices© 1995, pp. 2-5 to 2-22.

*Primary Examiner*—Tod R. Swann
*Assistant Examiner*—Christopher S. Chow
*Attorney, Agent, or Firm*—Mark M. Friedman

[57] ABSTRACT

A flash memory controller operates a flash memory array comprising a plurality of different types of flash memory chips. The CPU interacts with the array by issuing generic commands through a single Memory Technology Driver (MTD), while the controller translates the generic commands into commands specific to the chip comprising the portion of the array being addressed. The controller operates each of the flash chips which comprises the flash memory array, and presents to the CPU a memory system comprised of a single addressable entity. According to a further feature of the invention, the controller is embedded into each of the flash chips in an array in order to further reduce overhead costs.

29 Claims, 3 Drawing Sheets

STANDARDIZED FLASH CONTROLLER

FIELD AND BACKGROUND OF THE INVENTION

The present invention relates to flash memory arrays and flash memory modules. More particularly, this invention proposes a flash controller affording a standardized interface between the CPU and We flash memory arrays and modules.

Generally speaking, data is written to, or read from, the flash arrays and modules by executing a number of steps such as: locate an address, send data to a buffer, read data from buffer to the flash address, signal to the CPU that the data has been read to the flash address, and similar functions. In order that the flash module or array interact with the CPU a driver is present in the CPU. This driver is commonly known as the Memory Technology Driver, or MTD.

Unfortunately, the sequence of these steps, and often the actual steps, differ from manufacturer to manufacturer. Different flash chips usually have different methods of flash programming. These differences are due in part to the varying needs of the different flash technologies requiring different procedures, and to the sheer lack to an agreed standard for flash procedures. Thus the CPU must be configured for the particular brand of flash chip it is using. The confusion is exacerbated when considering a case in which a CPU is expected to interact with more than one type of flash chip. This is the case with removable flash arrays. Therefore there is a widely recognized need for, and it would be highly advantageous to have, a standardized interface between the CPU and any flash chip.

However, making a standard interface has proved difficult in light of the fact that in linear flash arrays the controller is so basic as to preclude the possibility of interfacing with any driver other than its own. In current flash arrays the CPU has direct control over the flash chips and is given the actual task of reading and writing to the flash chips. These entail having the CPU send commands specific to the chip for reading, writing (programming) and erasing.

An additional complication in the current method is that in addition to the functions mentioned above, the MTD must also have an identification routine enabling the MTD to recognize its own kind of flash in order that the CPU activate the appropriate MTD when it encounters a particular flash array. The identification routine must also communicate the size of the flash array (i.e., the number of chips contained in the array) and certain features of the flash array geometry, such as interleaving and bus width.

One approach taken to arrive at some degree of standardization has been the attempted use of a software standard known as the Card Services standard. This standard is part of the larger PCMCIA standard for PCMCIA cards. The Card standard serves as a shell through which commands are issued to and from the MTD. Thus the MTD interacts with the CPU, and with the flash, via a standardized mode of communication. This approach offers the possibility of issuing general commands independent of flash technology, such as ReadMemory and WriteMemory, and having Card services translate those requests into requests to the MTD.

However, this standard falls short in a number of areas. First, it is relevant only to PCMCIA cards and systems supporting Card services. Moreover, no software standard is capable of achieving complete interoperability for various types of flash arrays and modules. It is still necessary to have the appropriate MTD on the host CPU in order to operate each different type of flash. Third, as technology advances there is no guarantee that the range of operations afforded by the Card services will be sufficient to support the needs of the new technologies.

A more comprehensive attempt at standardization is the bid to use the ATA (or, IDE) standard. This is a well known electrical standard interface used for PC hard disks, and one that is universally used. It includes several commands, the most important of which are the read and write commands of sectors to and from a disk.

The PCMCIA Committee has used a variation of this standard suitable for the PCMCIA bus, calling it PCMCIA-ATA. Several flash manufacturers, among them IBM and Sundisk, provide PCMCIA flash cards that use this interface.

The primary fault with this approach lies in the fact that this is a hard disk standard, not a flash standard. And as a hard disk standard, the flash array (or module) must simulate the behavior of a disk. This means that the flash cannot be a mere flash array or module but must be a flash disk. This causes a number of severe limitations on the flash module being used: the flash module must contain a complete flash file system in order to simulate disk operations; and the fact that a flash module is being used, along with all of the special characteristics of flash technology, must be hidden from the interface.

This is not to say that it cannot be done. Indeed, the manufacturers mentioned above have successfully implemented the use of this interface with their flash modules. However, they have encountered a large overhead cost and much complexity. There still is a need for a far more versatile approach enabling the use of the flash in any form. Particularly, if it reduces both cost and complexity in the process. In addition, certain flash technologies are unsuitable for use with the ATA standard (for example, the Intel Flash), and for others the overhead costs are prohibitive.

SUMMARY OF THE INVENTION

According to the present invention the CPU is configured with a standardized driver which, according to the present invention, has the ability to interface with any flash chip. The present invention proposes a controller capable of interpreting signals from a standardized driver into commands particular to the flash unit. Thus the CPU will produce the commands necessary to perform the flash memory tasks in a uniform, standardized format. In this way the problem of conforming to the particular requirements of the flash chip is moved from the driver installed on the CPU onto the controller installed on the flash unit. The proposed controller is referred to herein as the standardized controller interface.

The standardized controller interface includes methods for issuing commands from the CPU to the Flash module, sending data buffers from the CPU to the Flash module, receiving data buffers from the Flash module to the CPU and receiving command completion status from the module. The ATA (IDE) interface and the SCSI interface use this model of interface. In order that it may share aspects such as electrical sockets and software framework with these existing interfaces, it would be advantageous to have the standardized controller interface resemble these as much as possible.

In order to best describe the operation of the standardized controller interface, the operations may be divided into two groups: interaction between the standardized controller and the CPU, and interaction between the standardized controller and the flash array.

The standardized controller can recognize four basic commands from the CPU (i.e., from the MTD driver):

Read—requests that a certain number of bytes be read from a given flash location.

Write—requests that a certain number of bytes be written to a given flash location.

Erase—requests that a flash block at a given address be erased.

Identify—in response to this command a standardized controller module will send the CPU an identification code that will identify itself as a standardized controller module, and in addition will send information about the flash array it controls including: the size of each individual flash chip; the size of the minimal erasable block size; the number of flash chips in the array; and the programming voltage needed.

Facilitating standardized controller interaction with the CPU, the standardized controller interface contains the following registers:

Command register. Here the CPU writes a command for the module to execute. Standardized controller translates that command into a command particular to the flash unit using relatively simple discrete logic or an FPGA (Field Programmable Gate Array), or a small or medium sized ASIC.

For example in the Intel 28F008 (8 mbit) Flash chip, reading is performed by (a) placing the chip in Read Array mode, and (b) reading from the chip as in RAM or ROM. Thus the standardized controller interface for such a chip upon receiving a read command for a specific flash address (via the Address register, see below) from the CPU would locate the required chip and the starting address within it; put the chip in Read Array mode by writing 0 or hex FF anywhere in the chip (a command unique to this particular chip) and then proceed to transfer bytes to the host via the Data register.

Data register. Here the data is sequentially passed to or from the module.

Continuing the above example, the bytes would be transferred from the flash chip to the standardized controller, and from the standardized controller to the host sequentially by a sequence of read signals from consecutive addresses beginning at the starting address given.

Address register. Here the CPU specifies the flash address at which a read/write operation takes place, when this is relevant.

Status register. Here the module signals the CPU of the success or failure of a command and of its availability for further commands.

In the case of the Intel 28F008 8-mbit chip, during write and erase the chip must enter Read Status mode. In this mode reading from any address within the chip gives the value of the status register at that address. Thus, if standardized controller receives a write command for a specific address on the flash, standardized controller will receive the data buffer, and use the address to locate the required chip and address via the Address register. The standardized controller would then sequentially perform the write procedure for each byte. In the present case a Write (hex 40) command would have to be written to the byte that is to be written. The chip would then automatically enter Read Status mode. The byte value would be written to the same address, and the chip's status register would be read in a loop until it signals that the write is complete. The standardized controller would sequentially perform the write procedure for each byte. When all bytes have been written, the standardized controller displays a completion code in it's status register for the CPU based on the chip's status register value.

To erase on the Intel 28F008 8-mbit chip, the standardized controller would select a chip and an erasable block within it based on the supplied address. The standardized controller would then execute the erase procedure for that block by writing an Erase (hex 20) command anywhere within the flash block to be erased. The chip automatically enters Read Status mode, providing the value of the status register for the address being erased. A Confirm Erase (hex D0) is then written to the same address, and erase starts. The chip's status register is polled to find out when the erase is completed. When the erase is completed, standardized controller displays a completion code based on the chip's status register value.

Count register. Here the CPU specifies the number of bytes for the read/write operation, when this is relevant.

Finally, to illustrate the Identify command using the Intel 28F008 chip, standardized controller would report the number of chips present, their interleaving factor, and the fact that they need 12 volts for write/erase operations. There are a number of ways in which this may be done. The simplest way is to have data either hard coded into the controller or set by mechanical jumpers and have that data returned automatically by standardized controller when the Identify command is received. A more sophisticated approach is to utilize the Read ID mode inherent in this chip (in which reading from any address returns one of several fixed codes that identify the chip's manufacturer and type), by having the standardized controller dynamically identify the array it is handling by issuing Read ID commands to ascending addresses in order to identify the presence of 28F008 chips at that location, and in this manner to automatically detect the number of chips and the interleaving.

According to a preferred embodiment of the invention, a standardized controller would be placed onto each flash chip in a flash array. The controllers would cooperate between themselves to give the host CPU the appearance of interfacing with a single standardized controller. Such an arrangement would remove the need for a separate standardized controller to interface for the entire flash array.

In order for such a configuration to work the array of controllers would need an internal protocol for communication between controllers, and a division of flash addresses and their assignment to the flash chips in the array such that an address issued by the host CPU would be understood by the array to belong to a particular chip. In addition, the array of standardized controller controllers would feature a method for adding together the sizes of the individual chips in order to present the size of the entire array when issued an "identify" command.

One such configuration is to designate one standardized controller in the array as the master controller to which "identify" commands are issued. That controller is connected to the other controllers in a daisy chain. When that first controller receives an identify command, it takes it's identify information and passes it to the next controller who produces it's own identify information and adds its size to the size received from the previous controller. This process is repeated until all of the controllers in the array have been polled and the result produced by the last controller is returned to the CPU.

The present invention successfully addresses the shortcomings of the presently known configurations by providing a uniform interface for the processing unit to interact with, regardless of the particular procedures necessary for the brand of flash chip in use. In addition, since the CPU can interact with any flash array or module regardless of the details of the flash chip's particular technology, there is no longer a need for the identification routine that had been necessary in the prior art.

The present invention discloses a novel approach to standardization, affording a standardized configuration for the central processing unit, and the flexibility of being able to use any type of flash device, as well as removing the need for an identification routine in the CPU.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a flash controller which can be used to interface between the flash array and the CPU. The principles and operation of the standardized controller may be better understood with reference to the drawings and the accompanying description.

Figure 1:
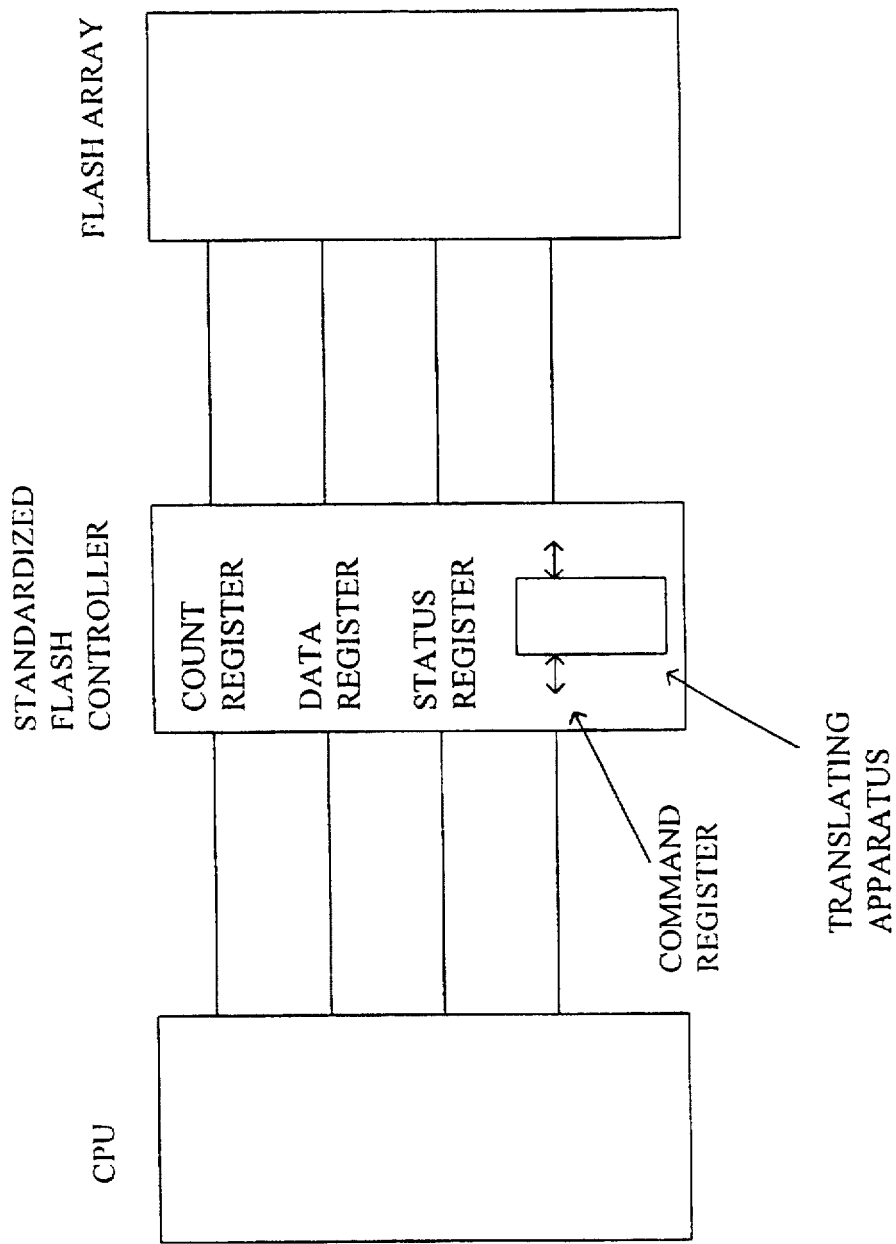
FIG. 1 is a block diagram describing the operation of the Standardized Controller.

Referring now to the drawings, FIG. 1 illustrates the operation of the standardized controller. Commands are received via the command register in a standardized format from the CPU. These commands are translated by the standardized controller translating apparatus into commands specific to the type of flash chip present. The complete interaction between CPU and flash array is via the various registers of the standardized controller. The standardized controller monitors the interaction so that it conforms to the procedures demanded by the current flash array.

Figure 2:
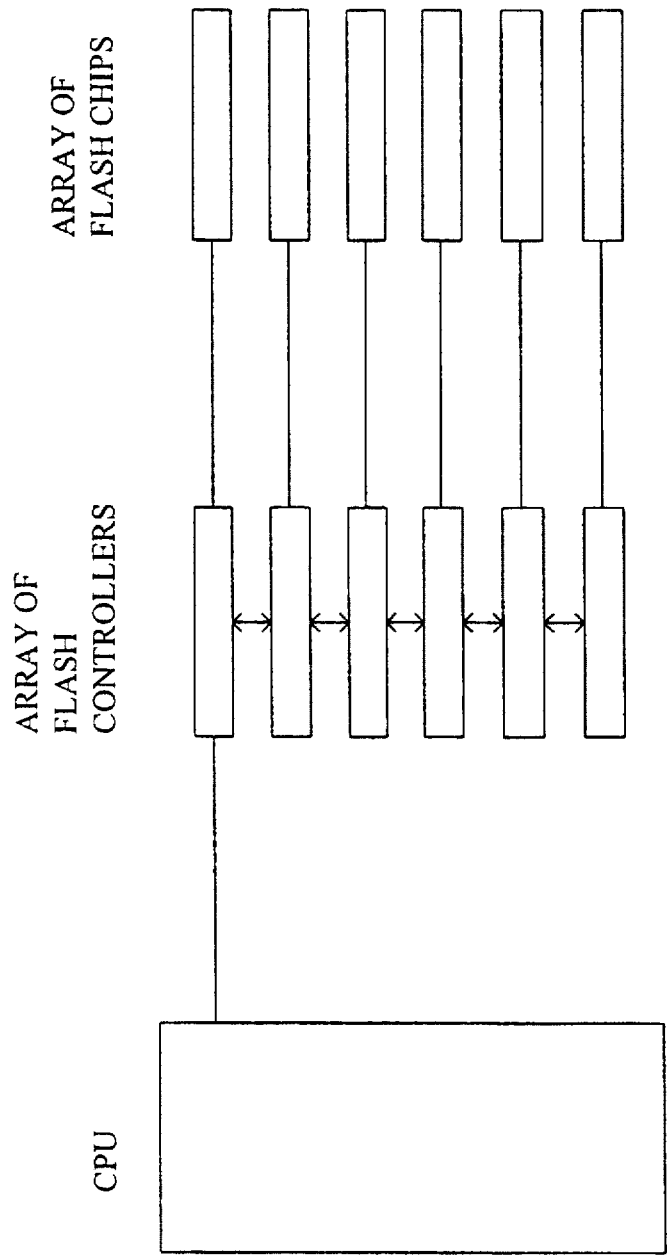
FIG. 2 is a block diagram describing the execution of an identify command being executed on an array of Standardized Controllers.
Figure 3:
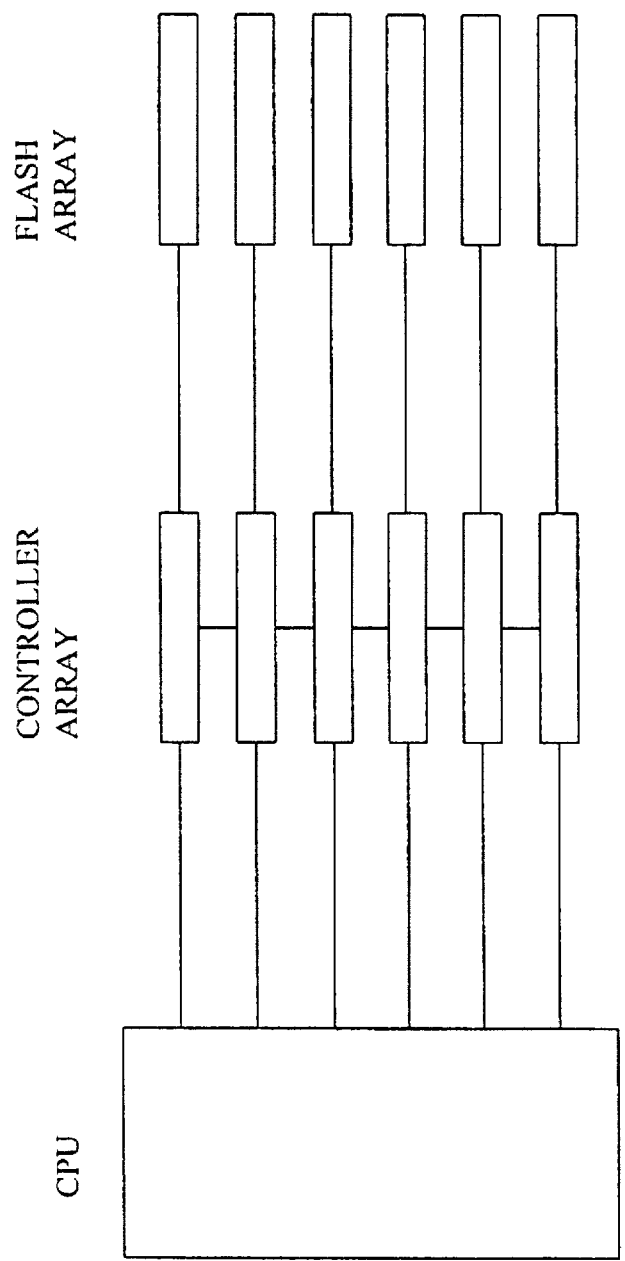
FIG. 3 is a block diagram illustrating the various component interactions in a flash array featuring chips each having their own Standardized Controller.

FIGS. 2 and 3 illustrate various aspects of placing standardized controllers on each flash chip in a flash array. FIG. 2 is a block diagram illustrating the execution of an identify command in such an array. One controller is set in Master mode, and the identify command activates only that controller. From the Master controller, the identify command would be issued in a daisy chain, eventually reaching each of the other controllers. Each controller would perform an identify command and add the result to those of all preceding controllers. The final result arrives at the controller set in Master mode, and that controller returns the result to the CPU.

FIG. 3 illustrates the interaction between the CPU and each of the flash chips and the interaction between the controllers.

What is claimed is:

1. A flash array controller system, comprising a plurality of flash array controllers, each of said controllers serving to control a flash chip of the flash array, each of said controllers including a translation apparatus for translating commands received from the CPU into commands particular to the flash chip, each of said controllers featuring:
   a. a count register,
   b. a data register,
   c. a status register,
   d. a command register that recognizes the following commands:
      read; write; erase; and identify;
wherein each of said controllers is located on one of said flash chips of the flash array, and wherein said controller features a protocol for communicating with another of said controllers, said controller system being configured such that flash addresses are divided and assigned to the various flash chips, said controller system featuring a method for summing up the total memory contained in the entire flash array and returning that sum to the CPU in response to an identify command.

2. A flash array controller system, comprising a plurality of flash array controllers, each of said controllers serving to control a flash chip of the flash array, each of said controllers including a translation apparatus for translating commands received from the CPU into commands particular to the flash chip, said translation apparatus being a simple discrete logic for translating commands received from the CPU into commands particular to the flash chip, each of said controllers featuring:
   a. a count register,
   b. a data register,
   c. a status register,
   d. a command register that recognizes the following commands:
      read; write; erase; and identify;
said controller further comprising particular data embedded into the controller that includes information about the flash chip, said information being at least one from the group consisting of the size of the flash chip, the size of the minimal erasable block, and the programming voltage needed;
wherein each of said controllers is located on one of said flash chips of the flash array, and wherein said controller features a protocol for communicating with another of said controllers, said controller being configured such that flash addresses are divided and assigned to the various flash chips, said controller system featuring a method for summing up the total memory contained in the entire flash array and returning that sum to the CPU in response to an identify command.

3. A flash array controller for controlling a flash array of a plurality of flash chips, the flash chips being of any type, the controller interacting with a driver on a CPU, the controller comprising a command register for receiving commands from the driver on the CPU and translating said commands into commands particular to the flash array, such that the type of flash chip is not restricted by the driver of the CPU, said command register recognizing the following commands: read, write, erase and identify.

4. The flash array controller of claim 3, wherein said command register translates said commands from the driver on the CPU using discrete logic.

5. The flash array controller of claim 3, wherein said command register translates said commands from the driver on the CPU using a Field Programmable Gate Array (FPGA).

6. The flash array controller of claim 3, wherein said command register translates said commands from the driver on the CPU using an ASIC (Application Specific Integrated Circuit).

7. The flash array controller of claim 3, further comprising a data register for transferring data between the flash array and the controller, and between the CPU and the controller, such that data is transferred for any type of flash chip.

8. The flash array controller of claim 3, further comprising embedded information for transmitting to the CPU in response to said identify command, said embedded information being selected from the group consisting of the size of each individual flash chip, the size of the minimal erasable block, the number of flash chips in the array, the interleaving factor for the flash chips and the required programming voltage for programming the flash chips.

9. The flash array controller of claim 8, wherein said embedded information is hard coded into the controller.

10. The flash array controller of claim 8, wherein said embedded information is set by mechanical jumpers configured to indicate flash array information.

11. The flash array controller of claim 3, wherein the controller, in response to said Identify command from the driver of the CPU, dynamically identifies the number of flash chips and the interleaving factor in the flash array by issuing Read ID commands to ascending flash addresses in order to identify the type of chips present, the size of each individual flash chip, the size of the minimal erasable block and the programming voltage required for programming the flash chips.

12. A flash array controller for controlling a flash array of a plurality of flash chips, the flash chips being of any type, the controller interacting with a driver on a CPU, the controller comprising an address register for assigning an address to each of the plurality of flash chips such that the flash chip is an assigned flash chip, and for receiving a requested address from the driver on the CPU and locating said requested address on said assigned flash chip having said requested address, such that the driver on the CPU is able to issue a command to an address on any of the plurality of flash chips.

13. The flash array controller of claim 12, further comprising a command register for receiving commands from the driver on the CPU and translating said commands into commands particular to the flash array, such that the type of flash chip is not restricted by the driver of the CPU, said command register recognizing the following commands: read, write, erase and identify.

14. The flash array controller of claim 13, wherein said command register translates said commands from the driver on the CPU using discrete logic.

15. The flash array controller of claim 13, wherein said command register translates said commands from the driver on the CPU using a Field Programmable Gate Array (FPGA).

16. The flash array controller of claim 13, wherein said command register translates said commands from the driver on the CPU using an ASIC (Application Specific Integrated Circuit).

17. The flash array controller of claim 13, further comprising a data register for transferring data between the flash array and the controller, and between the CPU and the controller, such that data is transferred for any type of flash chip.

18. The flash array controller of claim 13, further comprising embedded information for transmitting to the CPU in response to said identify command, said embedded information being selected from the group consisting of the size of each individual flash chip, the size of the minimal erasable block, the number of flash chips in the array, the interleaving factor for the flash chips and the required programming voltage for programming the flash chips.

19. The flash array controller of claim 18, wherein said embedded information is hard coded into the controller.

20. The flash array controller of claim 18, wherein said embedded information is set by mechanical jumpers configured to indicate flash array information.

21. The flash array controller of claim 13, wherein the controller, in response to said Identify command from the driver of the CPU, dynamically identifies the number of flash chips and the interleaving factor in the flash array by issuing Read ID commands to ascending flash addresses in order to identify the type of chips present, the size of each individual flash chip, the size of the minimal erasable block and the programming voltage required for programming the flash chips.

22. A flash array controller for controlling a flash array of a plurality of flash chips, the flash chips being of any type, the controller interacting with a driver on a CPU and with each flash chip in the array, the controller comprising:

(a) a count register for specifying a quantity of bytes for a read/write operation, as said count register recording said quantity of bytes according to a command from the CPU;

(b) a data register for sequentially passing data between the CPU and the flash array;

(c) a status register for giving a status of the flash array to the CPU;

(d) an address register for specifying a flash address for a read/write operation, said flash address being specified by the CPU; and (e) a command register for receiving commands from the driver on the CPU and translating said commands into commands particular to the flash array, such that the type of flash chip is not restricted by the driver of the CPU, said command register recognizing and translating said commands such that said commands from the driver on the CPU are executed on the flash array, said commands including read, write, erase and identify.

23. The flash array controller of claim 22, wherein said command register translates said commands from the driver on the CPU using discrete logic.

24. The flash array controller of claim 22, wherein said command register translates said commands from the driver on the CPU using a Field Programmable Gate Array (FPGA).

25. The flash array controller of claim 22, wherein said command register translates said commands from the driver on the CPU using an ASIC (Application Specific Integrated Circuit).

26. The flash array controller of claim 22, further comprising embedded information for transmitting to the CPU in response to said identify command, said embedded information being selected from the group consisting of the size of each individual flash chip, the size of the minimal erasable block, the number of flash chips in the array, the interleaving factor for the flash chips and the required programming voltage for programming the flash chips.

27. The flash array controller of claim 26, wherein said embedded information is hard coded into the controller.

28. The flash array controller of claim 26, wherein said embedded information is set by mechanical jumpers configured to indicate flash array information.

29. The flash array controller of claim 22, wherein the controller, in response to said Identify command from the driver of the CPU, dynamically identifies the number of flash chips and the interleaving factor in the flash array by issuing Read ID commands to ascending flash addresses in order to identify the type of chips present, the size of each individual flash chip, the size of the minimal erasable block and the programming voltage required for programming the flash chips.

* * * * *